Aug. 6, 1957 G. C. RAY 2,801,957
SELECTIVE SOLVENT FOR THE SEPARATION OF PHOSPHORUS
HALIDE AND HYDROCARBONS
Filed Dec. 27, 1954
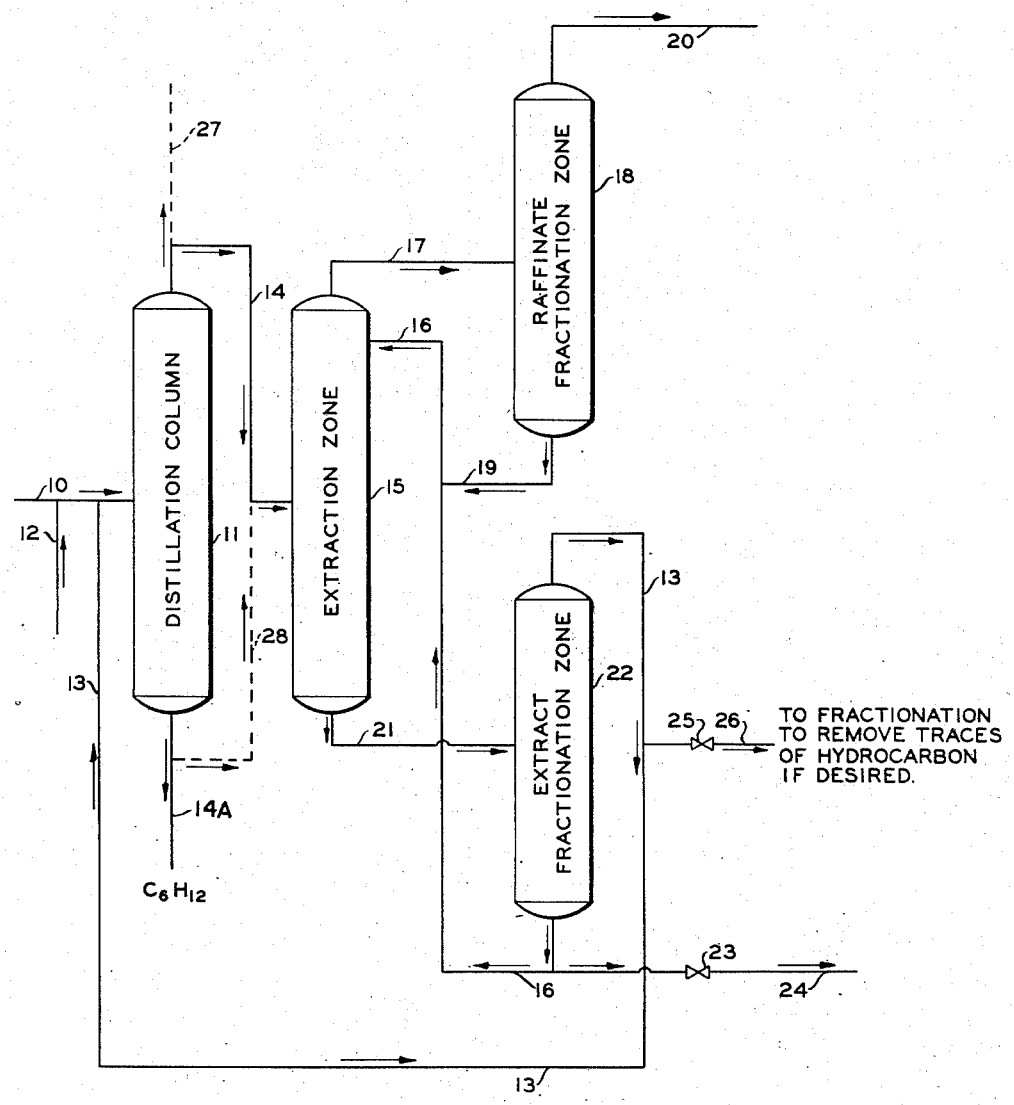
INVENTOR.
G. C. RAY
BY
*Hudson and Young*
ATTORNEYS

United States Patent Office 2,801,957
Patented Aug. 6, 1957

2,801,957

SELECTIVE SOLVENT FOR THE SEPARATION OF PHOSPHORUS HALIDE AND HYDROCARBONS

Gardner C. Ray, Bartlesville, Okla., assignor to Phillips Petroleum Company, a corporation of Delaware Application December 27, 1954, Serial No. 477,840

19 Claims. (Cl. 202—39.5)

This invention relates to the separation of phosphorus halides from hydrocarbons. In one of its aspects this invention relates to employing a dialkyl sulfate as a selective solvent in a process for separating phosphorus halides from hydrocarbons.

The processes of azeotropic distillation and extractive distillation for separating a hydrocarbon component from another hydrocarbon component of substantially the same boiling point contained in a complex hydrocarbon mixture are well known. In these processes, the hydrocarbon mixture is fractionally distilled in the presence of an added substance which has a preferential affinity for one of the components contained in the complex hydrocarbon mixture and thereby changes the relative volatilities of the hydrocarbons to such an extent that fractional distillation is feasible. When the added substance is employed in an azeotropic distillation process, it is generally referred to as an azeotrope former. When the added substance is employed in an extractive distillation process it is generally referred to as a solvent. The term "entrainer" is used herein and in the claims, unless otherwise stated, in its generic meaning to refer to either an azeotrope former in an azeotropic distillation process or a solvent in an extractive distillation process.

The phosphorus halides, particularly phosphorus trichloride and phosphorus tribromide, have been found to be excellent entrainers for the separation of some close-boiling hydrocarbons. For example, when a mixture of cyclohexane, 2,4-dimethylpentane and 2,2,3-trimethylbutane is fractionally distilled in the presence of a sufficient amount of phosphorus trichloride, the phosphorus trichloride has been found to azetrope with only the 2,4-dimethylpentane and the 2,2,3-trimethylbutane. In such an azeotropic distillation process substantially pure cyclohexane is recovered as bottoms product and a mixture of phosphorus trichloride and said paraffin hydrocarbons distills overhead. Copending application Serial No. 458,979, filed September 28, 1954, by W. T. Nelson discloses and claims the separation of close-boiling paraffinic and naphthenic hydrocarbons by distillation in the presence of phosphorus halides. As another example, when a mixture of ethylbenzene and para-xylene is extractively distilled in the presence of a sufficient amount of phosphorus tribromide, substantially pure ethylbenzene distills overhead and a mixture of phosphorus tribromide and para-xylene is recovered as a bottoms product. Copending application Serial No. 464,626, filed October 25, 1954, by W. T. Nelson discloses and claims the extractive distillation of close-boiling aromatic hydrocarbons in the presence of phosphorus tribromide.

One of the difficulties in these distillation processes wherein an added substance or entrainer is employed is in the separation or recovery of the added substance from the hydrocarbons in the hydrocarbon fraction with which it associates itself. Ordinarily, separation or recovery of the added substance is effected by phase separation, solvent extraction, azeotropic distillation, or extractive distillation processes. The separation of phosphorus halides, such as phosphorus trichloride and phosphorus tribromide, from hydrocarbons by solvent extraction is somewhat difficult because of the reactivity of the said phosphorus halides with many potential solvents.

I have found that dialkyl sulfates are effective selective solvents for the separation of phosphorus halides from mixtures of hydrocarbons and said phosphorus halides. Thus broadly speaking, the present invention provides a solvent and a process employing said solvent for effecting substantially complete separation of a phosphorus halide from mixtures of hydrocarbons and said phosphorus halide.

An object of this invention is to provide a selective solvent and a process employing said solvent for the separation of a mixture of a phosphorus halide and hydrocarbons.

Another object of this invention is to provide a selective solvent and a process employing said solvent for separating a phosphorus halide, employed as an added substance in a distillation process, from the hydrocarbons contained in the distillation fraction with which said phosphorus halide associates itself.

Another object of this invention is to provide a selective solvent and a process employing said solvent for separating a phosphorus halide, employed as an azeotrope former in an azeotropic distillation process, from the hydrocarbons contained in the distillation fraction with which said phosphorus halide associates itself.

Still another object of this invention is to provide a selective solvent and a process employing said solvent for separating a phosphorus halide, employed as a solvent in an extractive distillation process, from the hydrocarbons contained in the distillation fraction with which said phosphorus halide associates itself.

Further objects and advantages of the invention will be apparent to those skilled in the art upon reading this disclosure and the attached drawing.

Thus according to the present invention a dialkyl sulfate is employed as a selective solvent in a solvent extraction process to selectively separate a phosphorus halide from a mixture of a phosphorus halide and at least one of a paraffinic, a naphthenic and an aromatic hydrocarbon.

The dialkyl sulfates are chemically inert toward the phosphorus halides under extraction and stripping conditions, and the differential solubilities of the phosphorus halides and hydrocarbons in the dialkyl sulfate permit the selective separation of the phosphorus halide and hydrocarbons in a solvent extraction process with a relatively small number of contact stages.

The dialkyl sulfate solvent employed in the process of this invention should not have more than three carbon atoms in each alkyl radical and preferably not more than two carbon atoms in each alkyl radical. Examples of solvents which can be employed according to the invention are dimethyl sulfate, diethyl sulfate, di-n-propyl sulfate and di-isopropyl sulfate. Dimethyl sulfate is a presently preferred solvent because the use of solvents having more than one carbon atom in each alkyl radical requires that the extraction process be carried out at reduced temperatures in order to obtain phase separation.

The attached drawing is a diagrammatic flow sheet illustrating several embodiments of the invention.

Referring now to the drawing the invention will be more fully explained. A mixture of cyclohexane and 2,4-dimethylpentane is introduced through line 10 into distillation column 11. Also introduced into column 11 through line 10 is a sufficient quantity of phosphorus trichloride to azeotrope with said 2,4-dimethylpentane. Said phosphorus trichloride can be introduced into line 10 through line 12 from a source not shown or through line 13 from a source described hereinafter. In column 11 an azeotropic distillation is effected with substantially pure cyclohexane being removed from the bottom of said column through line 14A as a product of the process. An azeotropic mixture of phosphorus trichloride and 2,4-dimethylpentane and a small amount of cyclohexane is removed overhead from column 11, condensed in a condenser not shown, and passed through line 14 into extraction zone 15 wherein it is contacted countercurrently in a sufficient number of equilibrium stages with a stream of dimethyl sulfate introduced into the upper portion of said extraction column 15 through line 16. Extraction column 11 can comprise any suitable type of a contacting means such as a bubble cap column, a packed column etc.

A hydrocarbon-rich raffinate stream containing principally 2,4-dimethylpentane together with a minor proportions of phosphorus trichloride and dimethyl sulfate is removed from the upper portion of extraction zone 15 through line 17 and passed to fractionation zone 18. Dimethyl sulfate is removed from fractionation zone 18 through line 19 and returned to extraction zone 15 through line 16. A stream comprising 2,4-dimethylpentane and some phosphorus trichloride is removed from fractionation zone 18 as an overhead stream through line 20. If desired this stream in line 20 can be further extracted for further recovery of phosphorus trichloride.

A solvent-rich extract stream containing principally dimethyl sulfate and phosphorus trichloride together with a minor proportion of hydrocarbon is removed from the lower portion of extraction zone 15 through line 21 and introduced into fractionation zone 22. Dimethyl sulfate is removed from fractionation zone 22 through line 16 and returned to extraction zone 15. If desired a portion of the dimethyl sulfate from line 16 can be passed through valve 23 and line 24 to purification in order to prevent impurities from building up in the system and then returned to extraction zone 15. Phosphorus trichloride is removed as an overhead stream from fractionation zone 22 through line 13 and returned to distillation column 11. If desired a portion of the phosphorus trichloride in line 13 can be withdrawn through valve 25 and line 26 for further fractionation or other purification to remove traces of hydrocarbons or other impurities to prevent same from building up in the system.

In another embodiment the extraction process of the invention is employed in combination with an extractive distillation process. For example, a mixture of ethylbenzene and para-xylene, together with a sufficient amount of phosphorus tribromide to act as a solvent for said para-xylene, is charged through line 10 into distillation column 11 wherein an extractive distillation is effected and substantially pure ethylbenzene is removed overhead via dotted line 27. A mixture of para-xylene and phosphorus tribromide is withdrawn from column 11 and passed via dotted line 28 into extraction zone 15 wherein it is contacted with a stream of dimethyl sulfate as described above.

A hydrocarbon-rich raffinate stream containing principally paraxylene together with minor proportions of phosphorus tribromide and dimethyl sulfate is removed from the upper portion of extraction zone 15 through line 17 and introduced into raffinite fractionation zone 18 wherein it is fractionated in a manner described above.

A solvent-rich extract stream containing principally dimethyl sulfate and phosphorus tribromide together with a minor proportion of hydrocarbon is removed from the lower portion of extraction zone 15 via line 21 and introduced into extract fractionation zone 22. Dimethyl sulfate is removed from fractionation zone 22 through line 16 and returned to extraction zone 15. Phosphorus tribromide is removed as an overhead stream from fractionation zone 22 via line 13 and returned to distillation column 11.

While the description of the invention has been directed principally to the separation of phosphorus halides from hydrocarbon fractions produced in fractional distillation processes, it is not so limited. The dialkyl sulfate solvents and the processes employing same described herein can be employed in separating any mixture of a phosphorus halide and a hydrocarbon, toward which said halide is chemically inert, regardless of the method of formation of said mixture.

Furthermore, while the description of the invention given herein has been directed to the separation of phosphorus trichloride and phosphorus tribromide from hydrocarbons, the invention is not so limited. The invention is applicable to the separation of any phosphorus halide, which is chemically inert to the dialkyl sulfates of the invention under the conditions of the separation, and which exists as such in a mixture of said halide and a hydrocarbon toward which said halide is chemically inert.

The extraction process of the invention can be carried out under atmospheric conditions of temperature and pressure; however, reduced temperatures and pressures as well as elevated temperatures and pressures can also be employed. The temperature can vary over a considerable range and should be below the critical solution temperature of the hydrocarbon in the dialkyl sulfate but above the freezing point of the two liquid phases formed. For example, the critical solution temperature of 2,4-dimethylpentane and dimethyl sulfate is above 80° C. and temperatures in the range of 0–80° C. are employed for the separation of phosphorus trichloride and 2,4-dimethylpentane when dimethyl sulfate is employed as a solvent.

The proper choice of temperatures and pressures to be employed for any given separation will be understood by those skilled in the art. As a further example, the paraffinic hydrocarbons and naphthenic hydrocarbons exhibit a low order of solubility in dimethyl sulfate at normal room temperatures. Thus, depending upon the paraffinic or naphthenic hydrocarbon being separated from the phosphorus halide it may be desirable to carry out the extraction at temperatures above normal room temperatures. When equal volumes of benzene and dimethyl sulfate are mixed at normal room temperature of 75–80° F. two phases exist. Upon warming to temperatures above 100° F. the benzene and dimethyl sulfate are completely miscible. Thus, depending upon the aromatic hydrocarbon to be separated from a phosphorus halide it may be desirable to carry out the extraction at temperatures below normal room temperature.

The following example further illustrates the invention.

EXAMPLE

A mixture of 50 volumes of dimethyl sulfate was shaken for 30 minutes at 25° C. with 50 volumes of a mixture comprising 80 volume percent phosphorus trichloride and 20 volume percent 2,4-dimethylpentane. A liquid extract phase of 65 volumes and a liquid raffinate phase of 35 volumes were obtained. The compositions of the extract and raffinate phases are given in Table I. K is the distribution constant and expresses the ratio of the concentration of the component in the extract phase to the concentration of the same component in the raffinate phase. $K_r$ is the value of K relative to 2,4-dimethylpentane.

Table I

| Component | Conc. in Extract, Vol. Percent | Conc. in Raffinate, Vol. Percent | K | $K_r$ |
|---|---|---|---|---|
| Dimethyl sulfate | 65.4 | 21.4 | 3.05 | 32 |
| Phosphorus trichloride | 32.3 | 54.3 | 0.60 | 6.3 |
| 2,4-dimethylpentane | 2.3 | 24.3 | 0.095 | 1.0 |
| | 100.0 | 100.0 | | |

The above example illustrates the efficiency of dimethyl sulfate as a solvent for the separation of phosphorous trichloride and 2,4-dimethylpentane. The data show that the selectivity of dimethyl sulfate for phosphorus trichloride is six times the selectivity of dimethyl sulfate for 2,4-dimethylpentane. The above data represent the equilibrium attained in one contacting stage at the stated conditions. It will be realized by those skilled in the art that while the K will remain substantially constant from stage to stage, an increase in the number of contacting stages will result in an increase in the concentration of phosphorus trichloride in the extract phase and an increase in the concentration of 2,4-dimethylpentane in the raffinate phase.

As will be evident to those skilled in the art, various modifications of the invention can be made, or followed, in the light of the above disclosure and the appended claims, without departing from the spirit or scope of said disclosure and said claims.

I claim:

1. A process for the separation of a mixture of a phosphorus halide and hydrocarbons which comprises extracting said mixture with a dialkyl sulfate having not more than 3 carbon atoms in each alkyl radical.

2. A process for the separation of a phosphorus halide from a mixture of said halide and at least one of a paraffinic hydrocarbon, a naphthenic hydrocarbon and an aromatic hydrocarbon which comprises extracting said mixture with a dialkyl sulfate having not more than 3 carbon atoms in each alkyl radical.

3. A process for the separation of a phosphorus halide from a mixture of said halide and at least one of a paraffinic hydrocarbon, a naphthenic hydrocarbon and an aromatic hydrocarbon which comprises contacting said mixture countercurrently with a dialkyl sulfate having not more than 3 carbon atoms in each alkyl radical in a solvent extraction zone.

4. A process according to claim 2 wherein said dialkyl sulfate is dimethyl sulfate.

5. A process according to claim 2 wherein said sulfate is diethyl sulfate.

6. A process according to claim 2 wherein said sulfate is di-n-propyl sulfate.

7. A process according to claim 2 wherein said sulfate is diisopropyl sulfate.

8. A process according to claim 4 wherein said halide is phosphorus trichloride.

9. A process according to claim 4 wherein said halide is phosphorus tribromide.

10. In a distillation process for the separation of close-boiling hydrocarbons wherein a phosphorus halide is employed as an entrainer and wherein there is produced a hydrocarbon fraction containing at least one of said close-boiling hydrocarbons together with said phosphorus halide entrainer, the improved method of separating said phosphorus halide from said hydrocarbon fraction which comprises extracting said hydrocarbon fraction with a dialkyl sulfate having not more than 3 carbon atoms in each alkyl radical.

11. A method according to claim 10 wherein said distillation process is an azeotropic distillation.

12. A method according to claim 10 wherein said distillation process is an extractive distillation.

13. A method according to claim 11 wherein said entrainer is phosphorus trichloride and said dialkyl sulfate is dimethyl sulfate.

14. A method according to claim 12 wherein said entrainer is phosphorus tribromide and said dialkyl sulfate is dimethyl sulfate.

15. In a process for the separation of close-boiling hydrocarbons by distillation in a distillation zone wherein a phosphorus halide is employed as an entrainer and wherein there is produced a hydrocarbon fraction containing at least one of said close-boiling hydrocarbons together with said phosphorus halide entrainer, the improved method of operation which comprises: contacting said hydrocarbon fraction countercurrently with a dialkyl sulfate having not more than 3 carbon atoms in each alkyl radical in a solvent extraction zone to produce a hydrocarbon-rich raffinate phase and a solvent-rich extract phase containing said phosphorus halide dissolved in said dialkyl sulfate; fractionally distilling said extract phase to recover said phosphorus halide as an overhead stream and said dialkyl sulfate as a bottoms stream; returning said dialkyl sulfate stream to said solvent extraction zone; and returning said phosphorus halide stream to said distillation zone.

16. A process according to claim 15 wherein said close-boiling hydrocarbons comprise a mixture of 2,4-dimethylpentane and cyclohexane, said distillation carried out in said distillation zone is an azeotropic distillation, said phosphorus halide is phosphorus trichloride, and sad dialkyl sulfate is dimethyl sulfate.

17. A process according to claim 15 wherein said close-boiling hydrocarbons comprises a mixture of ethylbenzene and para-xylene, said distillation carried out in said distillation zone is an extractive distillation, said phosphorus halide is phophorus tribromide, and said dialkyl sulfate is dimethyl sulfate.

18. A process according to claim 2 wherein said halide is phosphorus trichloride.

19. A process according to claim 2 wherein said halide is phosphorus tribromide.

References Cited in the file of this patent
UNITED STATES PATENTS
2,463,919    Stribley et al. _____ Mar. 8, 1949